Figure 1:
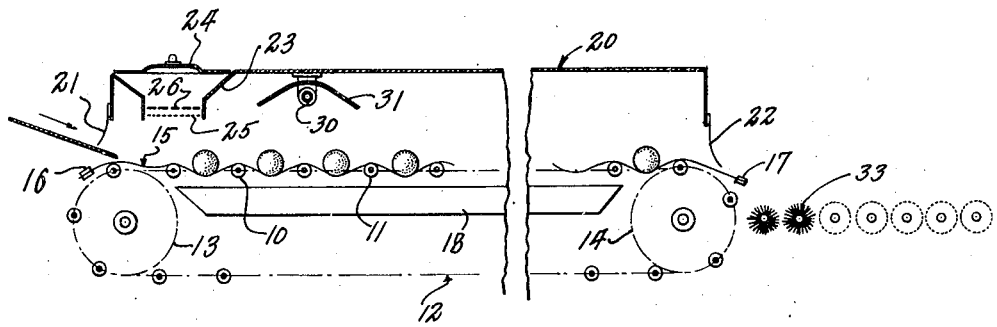

Aug. 13, 1940.    J. N. SHARMA    2,211,390
ART OF TREATING FRUIT

Filed June 15, 1936

INVENTOR.
Jagan N. Sharma
BY Lyon & Lyon
ATTORNEYS

Patented Aug. 13, 1940

2,211,390

UNITED STATES PATENT OFFICE

2,211,390

ART OF TREATING FRUIT

Jagan N. Sharma, Riverside, Calif., assignor to Food Machinery Corporation, San Jose, Calif., a corporation of Delaware Application June 15, 1936, Serial No. 85,207

6 Claims. (Cl. 99—103)

This invention relates to methods, means and ingredients whereby the desired varietal color of fruit may be enhanced in a ready and economical manner without deleteriously affecting the texture, appearance and keeping qualities of the fruit. The invention is particularly directed toward improvements in the art of treating whole citrus fruit such as oranges, tangerines, lemons and the like.

Within recent years processes have been devised whereby the color of whole fruit may be enhanced. One of these processes contemplates the formation of an aqueous emulsion containing a dispersed carrier which is miscible with the oily and waxy constituents of the skin or peel of the fruit, said carrier carrying or containing a suitable oil-soluble dye. When whole citrus fruit are contacted with such treating agent, the dye substance is carried into the skin or peel of the fruit and becomes a part thereof whereby the color of the fruit is materially enhanced.

In order to appreciate some of the disadvantages of prior treating methods, it is to be remembered that in normal packing house operations fruit are subjected to repeated treatments with solvents for oily smudge, closely adhering scale or dirt, or the like, and to other treatments directed to sterilization of the fruit or to the application of a waxy or oily substance whereby a suitable glossy finish or appearance is imparted to the fruit. Repeated treatment with aqueous or other liquid media is undesirable in that some of the essential oils and waxes carried by the fruit are leached, thereby developing a tendency for the fruit to wither upon storage or shipment.

Moreover, aqueous media often carry spores of decay molds which become lodged in cuts, bruises, stem ends or navels of the fruit, thereby inoculating fruit and increasing the tendency toward decay. Very often the cleansing or sterilizing solutions are maintained at temperatures as high as 115° F.–120° F. and obviously repeated treatment of citrus fruit with liquids at these high temperatures has a tendency to cook the fruit, drive off essential oils and weaken or otherwise impair the fruit.

The present invention is the result of extensive work and observations whereby it has been found that a desired varietal coloration may be imparted to whole citrus fruit without the use of liquid media. Moreover, it has been found that by careful control of conditions, such as temperature, it is possible to introduce a suitable dye substance into the peel of the fruit in a very short period of time. Moreover, it has been found that the introduction of the dye into the peel of the fruit is greatly facilitated not only by regulation of temperature but also by the type of treatment to which the fruit has been subjected prior to the coloring operation.

Generally stated, the present invention relates to a method whereby a desired varietal coloration may be imparted to whole citrus fruit by subjecting the same to contact with a carrier containing finely divided oil-soluble coloring substances such as a dye.

The invention also relates to a process in which whole citrus fruit are subjected to the action of either an acid hydrogen soap or a soap comprising an alkaline salt of a fatty acid, prior to contact of the fruit with a carrier containing an oil-soluble dye.

Moreover, the invention relates to processes in which the carrier is a finely divided material and the dye is in a state of fine division. The invention also contemplates the control of temperatures during contacting whereby the introduction of the dye substance into the peel is greatly facilitated.

An object of this invention, therefore, is to disclose and provide methods whereby the natural varietal color of whole fruit may be enhanced.

Another object is to disclose and provide means whereby the introduction of a suitable oil-soluble dye into the peel of the fruit may be facilitated.

A further object of the invention is to disclose apparatus whereby the methods of the invention may be placed in operation.

It has been discovered that in the event a finely divided oil-soluble dye is dusted over the peel of an untreated fruit such as an orange, such oil-soluble dye will not permeate the skin or peel even upon prolonged contact at normal room temperatures. This permeation of the skin or peel takes place with surprising rapidity at temperatures above about 90° F. as hereinafter described. When it is desired to operate at lower, normal room temperatures, the orange is first washed with a soap and then drained or even dried and then contacted with solid oil-soluble dye, the penetration of the dye into the skin or peel of the fruit is greatly facilitated. It appears that treatment of an orange with soaps or with waxes greatly facilitates subsequent introduction of oil-soluble dye into the peel, this being apparently due to a partial disintegration of the outer waxy layers of the skin or peel of the fruit.

By the term "soap" as used hereinabove and throughout this specification, reference is made to the fatty acid salts of alkalies and alkali earths including magnesium, and to acid soaps such as, for example, the strongly acid hydrogen soap lauryl sulfonic acid. Various vegetable and mineral waxes are also capable of exerting the effect described hereinabove and produced by the soaps.

The present invention is also based upon the discovery that brushing or rubbing of the fruit in the presence of finely divided oil-soluble dye facilitates the introduction of the dye into the peel or skin of the fruit. Again it has been found that the introduction of dye into the peel of fruit is greatly influenced by the temperature conditions existing during such introduction or by the temperature of the skin or peel of the fruit. Although the permeation of the peel is extremely slow at normal room temperatures or at temperatures below 80° F., an unexpectedly rapid permeation is attained at temperatures above 90° F. and preferably at temperatures of between 90° F. and 125° F. When the fruit is brushed with the dye, particularly at temperatures of 90° F. and thereabove, the pretreatment with soaps and the like is not essential.

When a finely divided solid oil-soluble dye is employed in the process of this invention, such dye may be used alone or with a carrier. The carrier may be either organic or inorganic. For example, the carrier may consist of a solid wax such as carnauba wax, beeswax, ceresin wax, paraffin wax or other waxy material or combination of waxy materials which are ordinarily substantially solid at normal atmospheric temperatures. Substances such as the metal salts of stearic, oleic and palmitic acids or the like (such as, for example, zinc stearate, aluminum stearate, aluminum oleate, aluminum palmitate, etc.) may be employed as carriers. The carriers or diluents may also comprise substantially inert, finely divided materials such as, for example, basic magnesium carbonate, diatomaceous earth, bentonite, or bentonitic clays, talc, steatite, pyrophyllite, or other minerals having a naturally flake-like characteristic, etc. The use of powdered or finely divided organic dyes alone is not recommended for commercial operation. It is desirable to employ mixtures containing such dyes and any of the carriers or diluents mentioned herein may be used for this purpose. Some of the metallic stearates and palmitates have sterilizing properties and since they are miscible with or have the property of penetrating the natural waxy layer of the fruit, the treated fruit is dyed and simultaneously rendered more resistant to decay. Mixtures of organic and inorganic carriers and waxes may be employed with the finely divided oil-soluble dye. Ordinarily, the treating agent or coloring substance employed contains from 2% to 15% of the oil-soluble dye, the remainder consisting of substantially solid waxes, inorganic diluents, stearates, palmitates, or the like.

Preferably the treating agent is in finely divided form and by this term reference is made to a product preferably passing a 16 or 30 mesh sieve. The oil-soluble dye is preferably present in a much finer state of subdivision, say 95% through a 100 or 150 mesh sieve. It is to be remembered that the dye may be partially soluble in the substantially solid waxes which are employed.

Forms of apparatus suitable for use in carrying out the process of this invention are shown in the appended drawings. As stated hereinbefore, the fruit is preferably washed with a solution containing a soap or an emulsion or dispersion in which the fruit is subjected to the action of soap and simultaneously covered with a thin film of wax or oil. The fruit are then introduced into a treating chamber in which they are contacted with the carrier containing an oil-soluble dye of a color adapted to impart a desired varietal coloration to the fruit. As shown in Fig. 1, this apparatus may include a continuous conveyor including rollers 10, 11, etc., spaced from six to ten inches from each other. This continuous conveyor, generally indicated at 12, is mounted upon suitable sprockets indicated at 13 and 14 and driven in any suitable manner, the driving means not being shown. Immediately above the upper lay of the conveyor a suitable cloth or fabric 15 is suspended. The ends of the fabric may be attached to fixed points as at 16 and 17, the fabric being sufficiently loose so that it forms depressions between adjacent rollers, such as the rollers 10 and 11. The side edges of the fabric 15 may also be lightly stitched or held to stationary means so as to distribute the extra length of the cloth or fabric 15 throughout its length between the points 16 and 17. Fabrics of various types may be employed. Positioned beneath the upper lay of the conveyor a pan 18 may be provided for the purpose of collecting any solid particles of dye or carrier and dye which may pass through the cloth.

The entire conveyor may be enclosed in a housing diagrammatically indicated at 20, said housing being provided with an inlet port, over which port there is hung a piece of cloth or other limp material indicated at 21. The outlet port may have a similar closure, as indicated at 22.

Means are provided for feeding dye onto the surface of the fruit near the inlet to the housing 20. Such means may include a hopper 23 provided with a removable closure 24 and a foraminous bottom 25. A punched plate or other foraminous member 26 may be slidably mounted on the ported bottom 25 of the hopper 23, said member 26 being actuated by any suitable means for the purpose of discharging regulatable quantities of dye or dye and carrier onto the fruit as they pass onto the cloth 15 and carrier 12.

Moreover, the housing 20 may be provided with means for heating the surface of the fruit to a desired temperature. Such means may include a resister bar 30 mounted in suitable electrical supports and supplied with electrical energy. A reflector 31 may be positioned above the heating element 30 for the purpose of directing the heat onto the fruit passing on the conveyor 12.

In operation the movement of the rollers 10 and 11 of the conveyor beneath the limp fabric 15 causes a form of wave motion in said fabric. The fruit rest in the valleys formed in the cloth between adjacent rollers and are continuously rotated during their movement from the inlet to the outlet of the housing 20. During such rotation frictional contact is set up between the cloth and the surface of the fruit and the finely divided dye or dye-containing substance is thus rubbed into the skin or peel of the fruit. The heating element 30 insures that the surface of the fruit is brought up to a desired temperature (above 85° F. and preferably between 90° F. and 125° F.), thereby facilitating the penetration of the skin or peel by the dye.

The fruit are then discharged through port 22 onto any suitable conveyor or brushing means. In Fig. 1 the fruit are shown discharged upon a plurality of driven transverse brushes 33, on which brushes the excess dye-containing carrier or unabsorbed dye is removed. If desired, the fruit may be rinsed to facilitate the removal of the excess material.

During the operation hereinabove described, the surface of the fruit is maintained sufficiently warm so that permeation of the skin or peel by the dye substance is facilitated. The dye substance is thoroughly rubbed into the surface of the fruit, dyeing and polishing the fruit simultaneously. In the event a portion of the carrier consists of zinc stearate or the like, having mold-inhibiting or antiseptic properties, the fruit are at the same time rendered more resistant to the ravages of decay.

Figure 2:
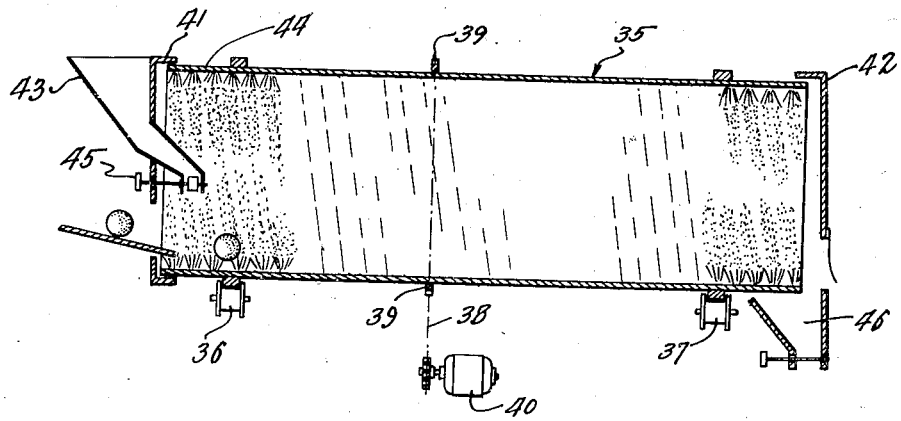

It is to be understood that the invention is not limited to its performance in the particular form of apparatus illustrated in Fig. 1. Fig. 2, for example, illustrates another form of device which may be employed. The apparatus of Fig. 2 comprises a cylindrical unit 35 mounted upon journalled rollers 36 and 37 and rotated upon its axis in any suitable means as, for example, by means of a continuous chain 38 in engagement with sprocket teeth 39 carried by the exterior of the cylinder 35, the chain being driven by means of a suitable motor or other means 40. The interior of the cylinder 35 is provided with means having a brush-like surface. The bristles are preferably arranged to form helical grooves on the interior surface of the cylinder.

Each end of the cylinder may be provided with a fixed stationary head, such as the heads 41 and 42. These heads are provided with suitable apertures so as to form an inlet port and an outlet port. The forward head of the cylinder 35 may be provided with a hopper 43 adapted to receive a supply of finely divided dye-containing material. The hopper 43 may be provided with a feeder 44 extending into the cylinder 35, the end of the feeder 44 being provided with a vibrating, shaking or rotating adjustable valve mechanism such as is diagrammatically illustrated at 45. The rear head 42 may be provided with a discharge port and with a hopper 46 adapted to receive excess dye-containing substance discharged from the cylinder 35. During rotation of the cylinder 35, fruit fed into the upper end of the cylinder are sprinkled with the dye-containing substance and then fed towards the outlet or rear head 42, the rate at which the fruit passes through the cylinder 35 depending upon the speed of rotation and the pitch of the helix formed by the brushes within the cylinder 35. During such rotation the dye-containing material is thoroughly rubbed into the skin or peel of the fruit. If desired, a heating element may be introduced into the cylinder for the purpose of maintaining a desired temperature therein or the fruit may be preheated before being introduced into the cylinder.

Excess dye-containing material is discharged into the hopper 46 and may be periodically returned to the hopper 43. The fruit, after being treated in the apparatus shown in Fig. 2, may be rinsed or brushed by a separate set of brushes for the removal of excess dye-containing substance. Various oil-soluble dyes may be used in the process of this invention. Dye substances of the character described in my co-pending application Serial No. 363 have been found very satisfactory. Dyes prepared by coupling aromatic amines with alphanaphthol and even with betanaphthol may be used. Among the aromatic amines which may be coupled with alphanaphthol are aniline, ortho-toluidine, xylidine, cumidine, aminoazobenzene, aminoazotoluene, diaminoditolylphenylmethane, diaminodiphenylmethane, betanaphthylamine, etc.

I claim:

1. In a fruit treating process, the step of enhancing the natural varietal color of the fruit comprising: subjecting the fruit to the action of a soap-like reagent from the group consisting of alkali salts of fatty acids, alkali earth salts of fatty acids, and acid soaps and adapted to partially disintegrate natural waxes carried in the outer portions of the skin or peel of the fruit, and then contacting the fruit with a substantially solid carrier containing an oil-soluble dye for a time and at a temperature adapted to introduce the dye into the peel of the fruit.

2. In a process of the character described in claim 1, the step of removing excess carrier and dye from the surface of the fruit after such contact.

3. A process of imparting a desired varietal coloration to whole citrus fruit, which comprises rubbing whole citrus fruit with a finely divided material, solid at atmospheric temperature, containing an oil-soluble dye, while the surface of the fruit is at a temperature above 90° F.

4. A process of imparting a desired varietal coloration to whole citrus fruit, which comprises: rubbing citrus fruit in the presence of a finely divided material, solid at atmospheric temperature, containing oil-soluble dye and a substantially solid waxy material, while the surface of the fruit is at a temperature above 90° F.

5. A process of imparting a desired varietal coloration to whole citrus fruit, which comprises: rubbing citrus fruit in the presence of a finely divided solid material containing oil-soluble dye and a finely divided solid inorganic diluent, while the surface of the fruit is at a temperature above 90° F.

6. A process of imparting a desired varietal varietal coloration to whole citrus fruit, which comprises: rubbing citrus fruit in the presence of a finely divided material, solid at atmospheric temperature, containing oil-soluble dye and a substantially solid metallic salt of a fatty acid, while the surface of the fruit is at a temperature above 90° F.

JAGAN N. SHARMA.